DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 11, 1971

886 O.G. 214

T886,012
PALLETS

William Bruce Ian Small, Welwyn Garden City, England, assignor to Imperial Chemical Industries Limited, London, England

Filed Apr. 27, 1970, Ser. No. 32,155
Claims priority, application Great Britain, May 5, 1969, 22,709/69
Int. Cl. B65d *19/18*
U.S. Cl. 108—51
1 Sheet Drawing. 5 Pages Specification

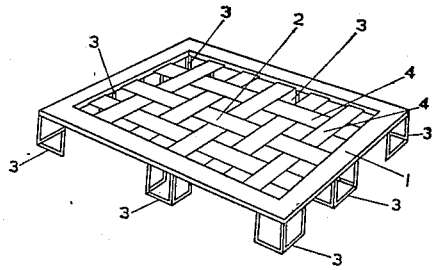

Pallets in which the load-bearing surfaces consist of interwoven bands of thermoplastic material mounted within a frame are disclosed. The interwoven bands are of a high tensile material such as tapes of polypropylene or high density polyethylene having the direction of the orientation of the molecules of the material along the axis thereof. Another suitable material is a strip consisting of fibers of polyethylene terephthalate embedded in a matrix of polyethylene. The frame supporting this interwoven band of plastic is of a light weight material such as, for example, tubular metal or another thermoplastic material. If a thermoplastic material is selected, foamed polypropylene is preferred for its strength and light weight. The woven load-bearing surface may be fitted within such a plastic frame by heat-sealing the strip to the frame or, with either metal or thermoplastic material, the ends of the load-bearing surface may be looped around the frame member and the material sealed to itself to secure each band to the frame.

The underside of the frame may be conveniently fitted with supports to receive the forks of a fork lift truck. Pallets thus produced are strong enough to withstand both the loads which they support and the rough handling to which they are subjected.

May 11, 1971 W. B. I. SMALL T886,012
PALLETS
Filed April 27, 1970
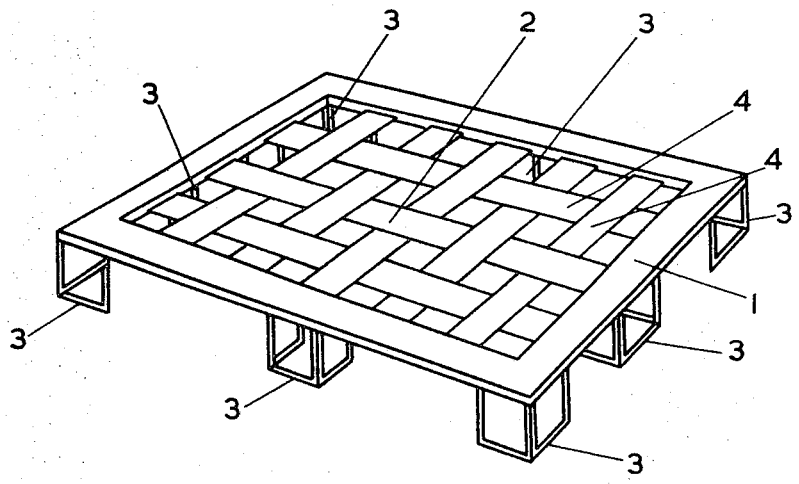
INVENTOR
WILLIAM BRUCE IAN SMALL
By Cushman, Darby & Cushman
ATTORNEYS